US009849829B1

(12) United States Patent
Salter et al.

(10) Patent No.: US 9,849,829 B1
(45) Date of Patent: Dec. 26, 2017

(54) VEHICLE LIGHT SYSTEM (71) Applicant: Ford Global Technologies, LLC, Dearborn, MI (US)

(72) Inventors: Stuart C. Salter, White Lake, MI (US); Paul Kenneth Dellock, Northville, MI (US); Cornel Lewis Gardner, Romulus, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/447,927

(22) Filed: Mar. 2, 2017

(51) Int. Cl.
*B60Q 1/00* (2006.01)
*B60Q 1/26* (2006.01)
*B60Q 1/32* (2006.01)
*B60Q 1/24* (2006.01)

(52) U.S. Cl.
CPC ............. *B60Q 1/323* (2013.01); *B60Q 1/24* (2013.01); *B60Q 2400/10* (2013.01); *B60Q 2400/40* (2013.01)

(58) Field of Classification Search
CPC ......... B60C 1/24; B60C 1/245; B60C 1/2607; B60C 1/2619; B60C 1/2696; B60C 1/323; B60C 1/48; B60C 1/50; B60C 2400/10; B60C 2400/20; B60C 2400/40
USPC ................ 362/487, 495, 501, 509–510, 540, 362/543–545
See application file for complete search history.

(56) References Cited

U.S. PATENT DOCUMENTS

| 2,486,859 | A | 11/1949 | Meijer et al. |
| 5,053,930 | A | 10/1991 | Benavides |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,260,988 | B1 | 7/2001 | Misawa et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,587,573 | B1 | 7/2003 | Stam et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |

(Continued)

FOREIGN PATENT DOCUMENTS

| CN | 101337492 A | 1/2009 |
| CN | 201169230 Y | 2/2009 |

(Continued)

*Primary Examiner* — Jason M Han
(74) *Attorney, Agent, or Firm* — Jason Rogers; Price Heneveld LLP (57) ABSTRACT

A light system for a vehicle is provided herein. The light system includes first and second light sources. A lens is configured to create a first illumination pattern when the first light source is activated and a second illumination pattern when the second light source is activated. A third light source is configured to create a third illumination pattern that extends vehicle outward of the first and second illumination patterns. A controller is configured to activate the first light source when a front door of the vehicle is opened and activate the second light source when a rear door of the vehicle is opened.

18 Claims, 7 Drawing Sheets

(56) References Cited

U.S. PATENT DOCUMENTS

| | | |
|---|---|---|
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,354,182 B2 | 4/2008 | Bartels |
| 7,425,088 B2 | 9/2008 | Weitzel |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,969,097 B2 | 6/2011 | Van De Ven |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,283,819 B2 | 3/2016 | Salter et al. |
| 9,299,887 B2 | 3/2016 | Lowenthal et al. |
| 9,442,888 B2 | 9/2016 | Stanfield et al. |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0030609 A1 | 2/2016 | Peterson et al. |
| 2016/0059771 A1 | 3/2016 | Meinzer et al. |
| 2016/0082880 A1 | 3/2016 | Co et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2005280657 A | 10/2005 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |
| WO | 2016012651 A1 | 1/2016 |

VEHICLE LIGHT SYSTEM

FIELD OF THE INVENTION

The present invention generally relates to vehicular lighting, and more particularly to vehicle lighting assemblies disposed on an exterior portion of the vehicle.

BACKGROUND OF THE INVENTION

Vehicular lighting assemblies are generally installed on exterior portions of a vehicle to illuminate the ground surrounding the vehicle to assist an occupant approaching the vehicle. It is therefore desired to implement improved lighting assemblies for further assistance of vehicle occupants.

SUMMARY OF THE INVENTION

According to one aspect of the present disclosure, a light system for a vehicle is disclosed. The light system includes first and second light sources. A lens is configured to create a first illumination pattern when the first light source is activated and a second illumination pattern when the second light source is activated. A third light source is configured to create a third illumination pattern that extends vehicle outward of the first and second illumination patterns. A controller is configured to activate the first light source when a front door of the vehicle is opened and activate the second light source when a rear door of the vehicle is opened.

According to another aspect of the present disclosure, a vehicle light system is disclosed. The vehicle light system includes a light source disposed on an exterior portion of the vehicle. A lens is operably coupled with the light source and is configured to direct light towards a ground surface proximate the exterior portion of the vehicle. A light sensor is configured to detect a presence of a compound on an outer surface of said light system by detecting an amount of incident light reflected by an inner surface of the lens.

According to yet another aspect of the present disclosure, a light system is disclosed. The light system includes a substrate and a lens. The substrate is coupled to a doorsill of a vehicle. A first light source is configured to illuminate a portion of ground proximate a front door. A second light source is configured to illuminate a portion of ground proximate a rear door. A third light source is configured to illuminate a ground surface outwardly of the first and second light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
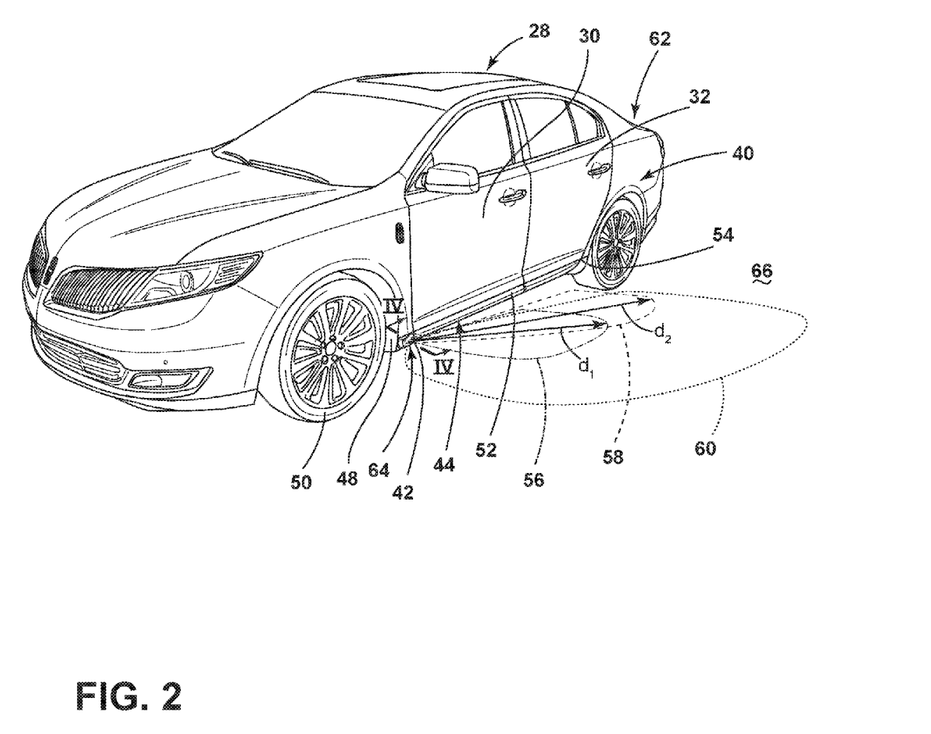
FIG. 2 is a side perspective view of a vehicle having a light system disposed on a doorsill of the vehicle, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes a light system for a vehicle. In various embodiments, the light system alters an illumination pattern based on a wide array of vehicle conditions. The light system may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
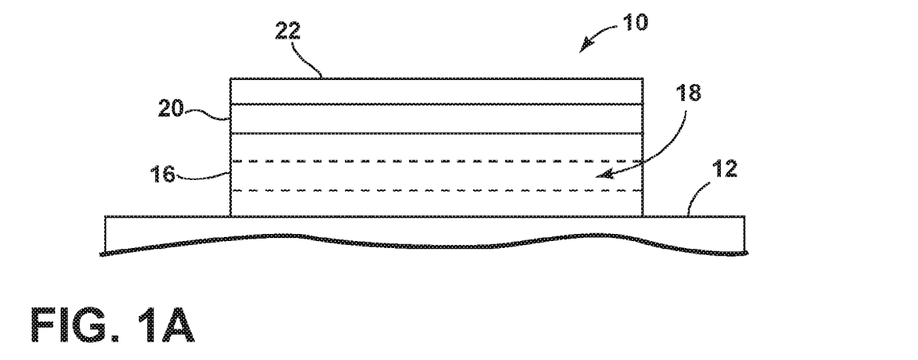
FIG. 1A is a side view of a luminescent structure rendered as a coating, according to various embodiments.
Figure 1B:
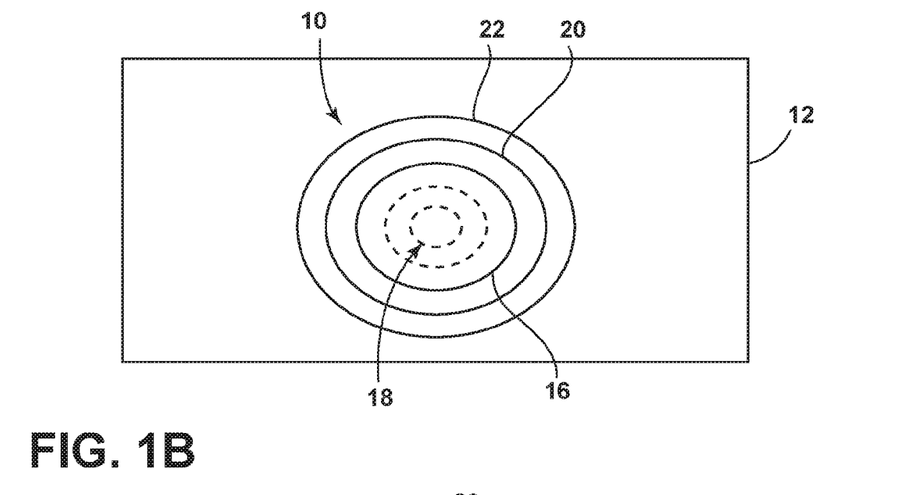
FIG. 1B is a top view of a luminescent structure rendered as a discrete particle according to various embodiments.
Figure 1C:
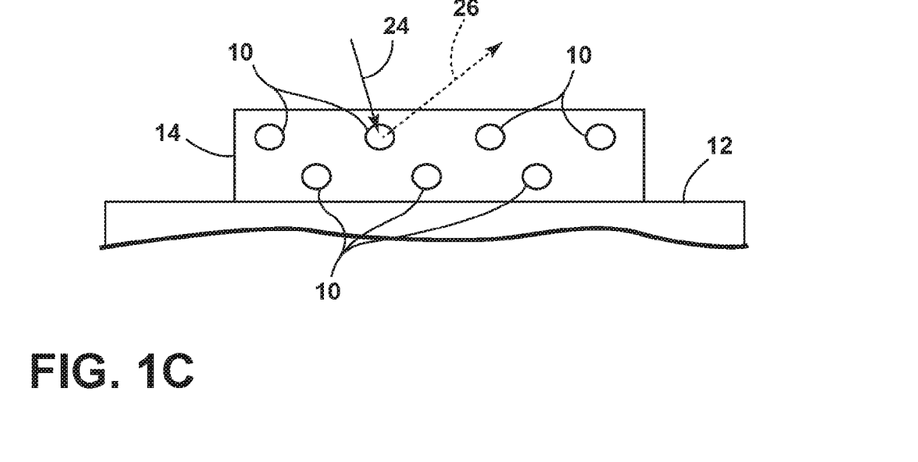
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 42 (FIG. 2) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 64. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Agrawal et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 64). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 64 that emit the excitation light 24, including, but not limited to, natural light sources (e.g., the sun) and/or any artificial light sources 64. The periodic absorption of the excitation light 24 from any excitation source may provide for a substantially sustained charge of the long-persistence luminescent material 18 to provide for consistent passive illumination. In various embodiments, a light sensor 80 may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure Li2ZnGeO4 and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Figure 3:
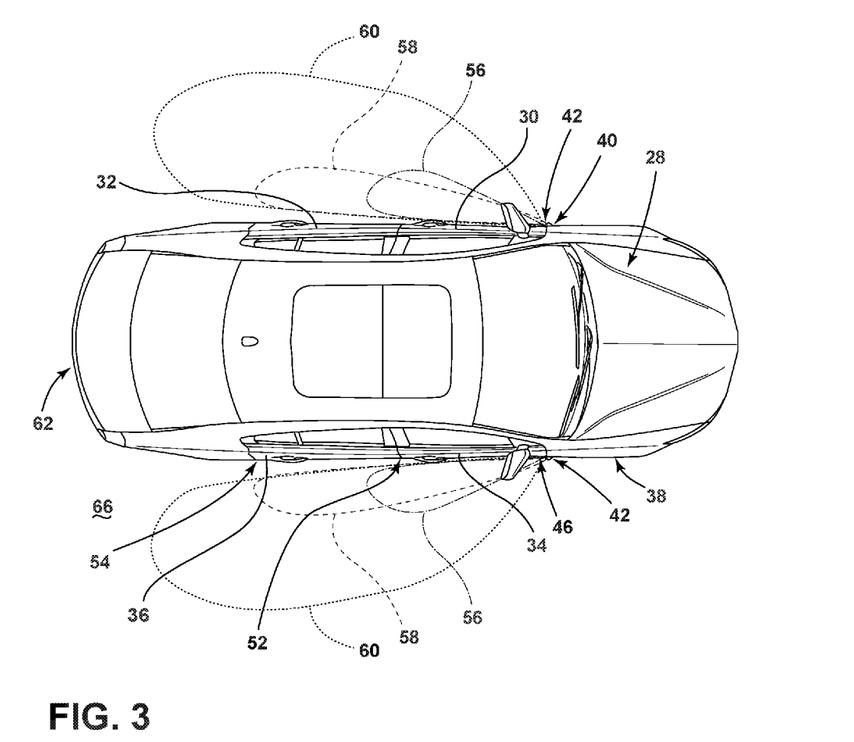
FIG. 3 is a top perspective view of the vehicle having the light system disposed on two opposing sides of the vehicle, according to various embodiments.

Referring to FIGS. 2 and 3, a vehicle 28, according to various embodiments, includes a driver's door 30 and a driver's side (or first side 40) rear door 32. Similarly, the vehicle 28 may also include a front passenger-side door 34 and/or a rear passenger-side door 36 situated on a second lateral side 38 of the vehicle 28 (FIG. 2) opposite from a first side 40 that includes the driver's door 30. In the exemplary embodiment shown in FIGS. 2 and 3, a light system 42 is provided on and/or within a doorsill 44 beneath one or more of the doors 30, 32, 34, 36. According to various embodiments, the light system 42 may be situated on a front portion 46 of the doorsill 44 in the region of the wheel well 48 surrounding the wheel 50. According to alternate various embodiments, the light system 42 may be situated on other portions (e.g., a central portion 52 or a rearward portion 54) of the doorsill 44 or any other exterior portion of the vehicle 28. As will be described in greater detail below, the light system 42 may generate a plurality of predetermined illumination patterns 56, 58, 60 in a targeted manner or predefined pattern proximately to the vehicle 28 based on a wide array of vehicle conditions. It will be appreciated that the vehicle 28 may be any type of vehicle 28 that includes any number of doors 30, 32, 34, 36 without departing from the teachings provided herein.

Referring still to FIGS. 2 and 3, a first illumination pattern 56 may extend towards a rear portion 62 of the vehicle 28 a first distance $d_1$. A second illumination pattern 58 may extend towards the rear portion 62 of the vehicle 28 a second distance $d_2$ that is larger than the first distance. A third illumination pattern 60 may extend outwardly from the vehicle 28 and outwardly of the first and/or second illumination patterns 56, 58. According to various embodiments, each illumination pattern 56, 58, 60 may be provided in a wide array of light wavelengths such that each pattern 56, 58, 60 may illuminate in a wide array of visible light colors. The illumination patterns 56, 58, 60 may provide from one or more light sources 64.

The light system 42 may be installed, possibly symmetrically, on the opposing lateral sides 38, 40 of the vehicle 28. In other words, suitably reflected light distributions may be generated next to the vehicle 28 on both the lateral sides 38, 40 of the vehicle 28. The illumination patterns 56, 58, 60 may be utilized during a welcome/farewell sequence, meaning any illumination pattern 56, 58, 60 may be illuminated as the driver and/or an occupant of the vehicle 28 approaches and/or exits the vehicle 28. The illumination patterns 56, 58, 60 may illuminate a ground surface 66 next to the vehicle 28 to enhance visibility, safety, aesthetics, etc. of the vehicle 28. In addition, due to the arrangement of the light system 42 below of the vehicle doors 30, 32, 34, 36 in various embodiments, there may be minimal, or no, shadowing of the illumination patterns 56, 58, 60, i.e., the light distribution is visible on the ground surface 66 around the vehicle 28, regardless of the position of the doors 30, 32, 34, 36.

Figure 4:
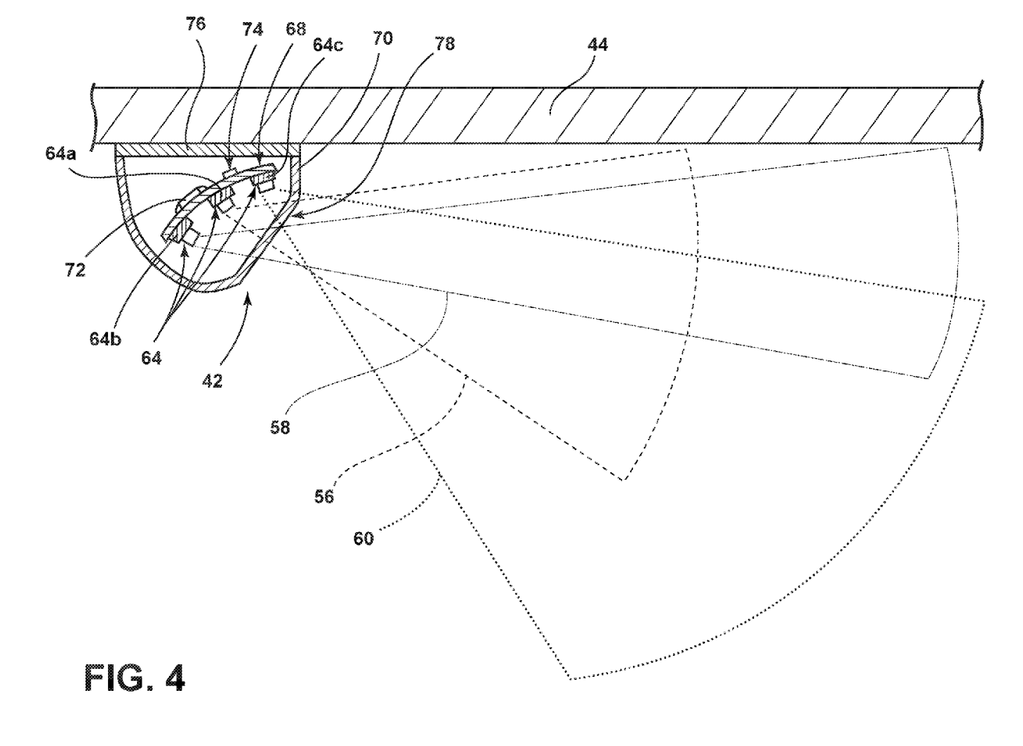
FIG. 4 is a cross-sectional view of the light system of FIG. 2 taken along the line IV-IV illustrating the light system, according to various embodiments.

Referring to FIG. 4, the light system 42 includes a plurality of light sources 64, such as three light sources 64a, 64b, 64c, mounted to one or more circuit board(s) 68. The one or more light sources 64 may be configured to emit visible and/or non-visible light, such as blue light, UV light, infrared light, and/or violet light and may include any form of light source 42. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light system 42. Further, various types of LEDs are suitable for use as the light sources 64 including, but not limited to, top-emitting LEDs, side-emitting LEDs, and others. Excitation light 24 generated by the one or more light sources 64 passes generally through a lens 70 to the outside environment when one or more light sources 64 is illuminated.

The one or more circuit board(s) 68 may be configured as a printed circuit board (PCB) containing a controller 72 including control circuitry including LED drive circuitry for controlling activation and deactivation of the light sources 64. The circuit board 68 may be configured in any fashion known in the art including, but not limited to, any flexible PCB and/or rigid PCB. The controller 72 may modify the intensity of the emitted wavelengths of excitation light 24 by pulse-width modulation, current control and/or any other method known in the art. In various embodiments, the controller 72 may be configured to adjust a color and/or intensity of the excitation light 24 by sending control signals to adjust an intensity or energy output level of the light source 64. According to various embodiments, the controller 72 may increase the intensity of excitation light 24 emitted from any of the light sources 64 up to five times steady state. According to various embodiments, multicolored light sources 64, such as Red, Green, and Blue (RGB) LEDs that employ red, green, and blue LED packaging may be used to generate various desired colors of light outputs from a single light source 64, according to known light color mixing techniques.

Each of LEDs 64a, 64b, 64c includes electrical circuitry 74 for receiving electrical power to generate light illumination at a desired wavelength or frequency. In various embodiments, each of LEDs 64a, 64b, 64c generates a light output at a different wavelength. The circuitry and light sources 64 are disposed between a substrate 76 that may be attached to the vehicle 28 and the lens 70, or integrally formed therewith. The lens 70 includes optics 78 to direct the light generated by the light sources 64 into the plurality of illumination patterns 56, 58, 60. For example, the lens 70 may be configured as a Fresnel lens, a pillow optic, and/or any other type of lens or optic that is configured to disperse, concentrate, and/or otherwise direct light emitted from the light sources 64 therethrough in any desired manner. The lighting assembly provided herein may allow for the use of cost-effective and efficient LEDs to achieve a desired light illumination.

Referring still to FIG. 4, according to various embodiments, the first and second illumination patterns 56, 58, when generated by the light sources 64 may be at a first intensity as an occupant approaches or exits the vehicle 28. The third illumination pattern 60 may be emitted from the light sources 64 at a second, lower intensity. According to various embodiments, the light sources 64 may emit a warm light having a color temperature range of about 2500 to 4500K and/or cool light having a color temperature range of about 5000K to 6500K. According to various embodiments, the third light source 64c, or any other light source 64a, 64b generating any illumination pattern 56, 58, 60, may emit a warm light as an occupant approaches a vehicle 28, and in a cool light as the occupant exits the vehicle 28.

With further reference to FIG. 4, the lens 70 may be formed from a material that may protect the light system 42 from physical and chemical damage arising from environmental exposure. Accordingly, the lens 70 may have properties such as viscoelasticity (i.e., having both viscosity and elasticity), a low Young's modulus, and/or a high failure strain compared with rigid components of the vehicle 28, such as a window of the vehicle 28 and/or a body component. The lens 70 may continue to have flexible properties at low temperatures, such as temperatures below 0 degrees Celsius. According to various embodiments, the lens 70 may be formed from a material containing silicone, urethane, flexible polycarbonate, flexible polypropylene, thermoplastic compositions, thermoset compositions, elastomeric compositions, polymeric compositions, and/or any other flexible and/or moldable material or mixture. In alternate embodiments, the lens 70 may be may be made of plastic. According to various embodiments, the usage of the materials disclosed herein may provide hydrophobic and/or hydrophilic properties that may assist in repelling some compounds 90 (FIG. 5) (e.g., oils and greases) dirt, grime, and other contaminants that may come in contact with the vehicle 28 and/or the light system 42.

Figure 5:
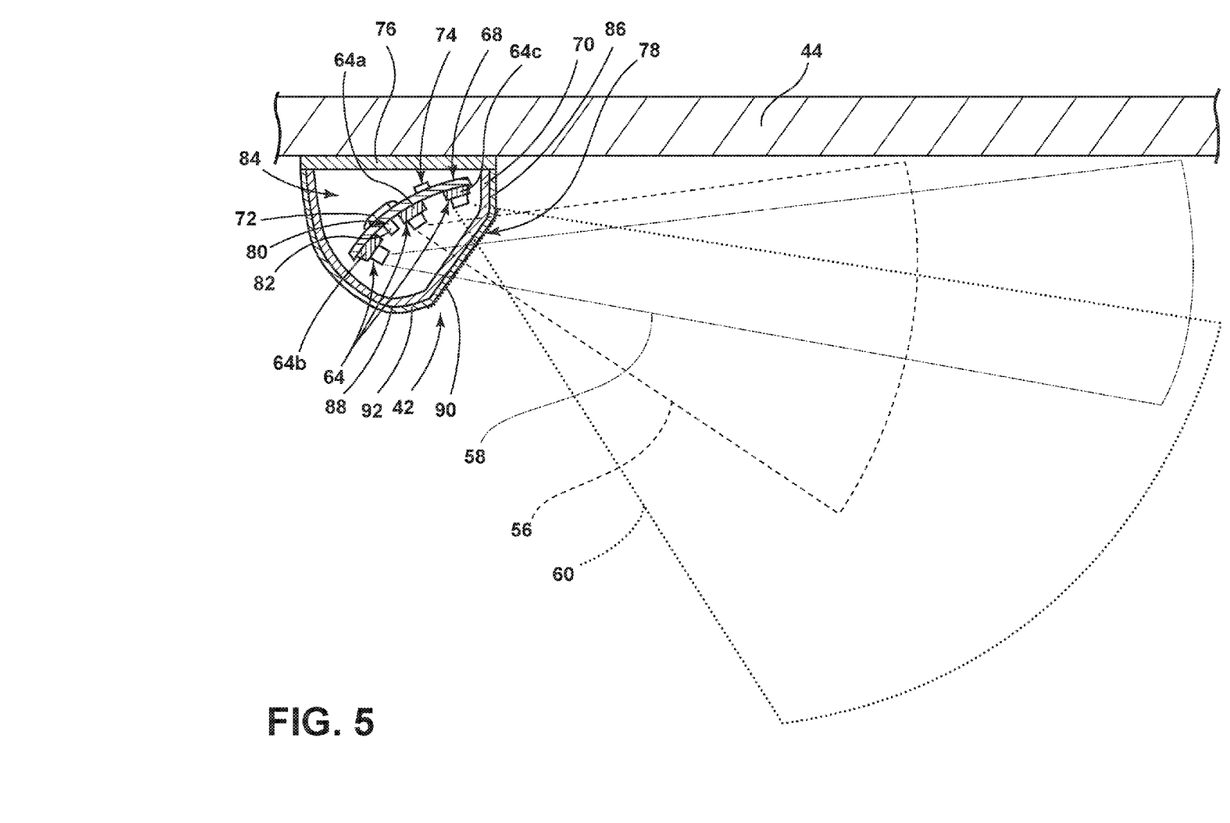
FIG. 5 is a cross-sectional view of the light system of FIG. 2 taken along the line IV-IV illustrating the light system, according to various embodiments, having a light sensor within the light system.

Referring to FIG. 5, a light sensor 80 may be disposed within the light system 42 that includes a receiver 82. When the light sources 64 are activated, a first portion of the excitation light 24 is directed through the lens 70 while a second portion of the excitation light 24 becomes incident within a space 84 defined between an inner surface 86 of the lens 70 and the substrate 76. As compounds 90 accumulate on the outer surface 86 of the lens 70 and/or an outer surface 88 of the light system 42, the incident light is attenuated more strongly in its intensity within the space 84 and, consequently, at the receiver 82. The accumulation 30 may be distributed more or less homogeneously over a portion of the outer surface 88 of the light system 42. Accordingly, the light sensor 80 may determine whether the light system 42 has a compound 90 disposed thereon, and, in some instances, may estimate the thickness of the compound 90 by detecting an amount of incident light reflected by an inner surface 86 of the lens 70. Based on the thickness of the compound 90, the controller 72 may also increase the intensity of excitation light 24 emitted from each light source 64a, 64b, 64c to compensate for the translucent lens 70/outer surface 88 of the light system 42.

If the accumulated compound 90 is above a predefined thickness, the vehicle 28 may provide an occupant of the vehicle 28 and/or a person in close proximity to the vehicle 28 with a notification that the light system 42 should be cleaned of the accumulated compound 90. If the accumulated compound 90 is below a predefined thickness, an activation layer 92, which may be disposed on the lens 70, may break down the compound 90. The activation layer 92 may be passive, or configured to constantly (e.g., substantially all the time) break down the compound 90, or may be active and be activated upon receiving excitation light 24 (e.g., ultraviolet light) or energy from the light sources 64.

In various embodiments, initiation of the activation layer 92 by the light sources 64 may result in the activation layer 92 releasing charged or uncharged hydroxyl radicals, which may react with the above-noted compounds 90 to create the cleaning, compound removing, and/or disinfecting properties. The activation layer 92 may include antimicrobial agents such as metal particles (e.g., titanium, cobalt, nickel, copper, zinc, zirconium, molybdenum, tin, cerium, and/or lead) and oxides thereof in sufficient quantities to have an antimicrobial or antiviral effect. For example, the activation layer 92 may include $TiO_2$, ZnO, CuO, $SnO_2$ and/or combinations thereof.

In various embodiments, the antimicrobial agents of the activation layer 92 may have a size on the order of nanoscale particles (e.g., particles having an average diameter of less than about 1μ, less than about 500 nm, less than about 100 nm, less than about 10 nm, less than about 2 nm, or less than about 1 nm). In one exemplary embodiment, the activation layer 92 may include a plurality of $TiO_2$ nanoparticles, which activate and become antimicrobial, antifungal, antiviral, and/or anti-organic upon application of ultraviolet light (e.g., light having a wavelength less than about 375 nm) from the light sources 64. The activation layer 92 may be applied via sputter coating, physical vapor deposition, chemical vapor deposition, plasma deposition, vacuum deposition, cathodic arc deposition, other plasma deposition techniques, and/or conventional vacuum coating technology.

Figure 6:
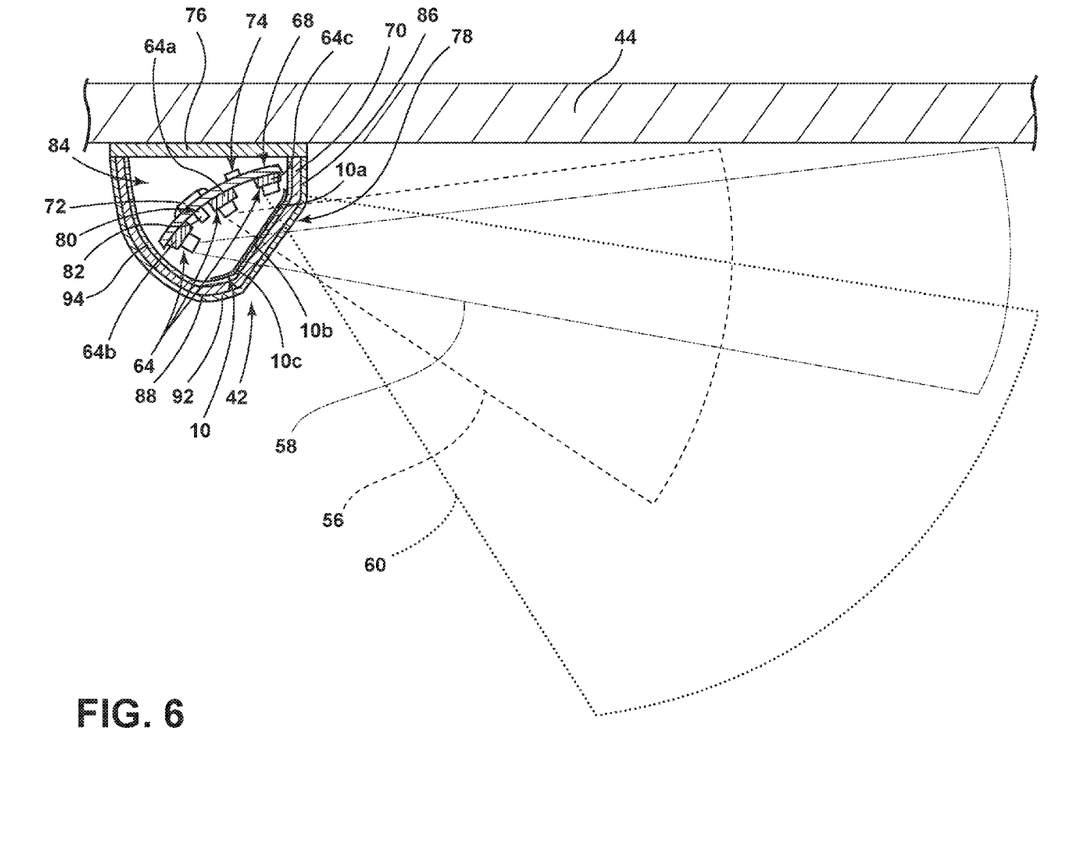
FIG. 6 is a cross-sectional view of the light system of FIG. 2 taken along the line IV-IV illustrating the light system, according to various embodiments, having a luminescent structure on a lens of the light system.

Referring to FIG. 6, the luminescent structure 10 may be optically coupled with one or more of the light sources 64. In operation, the luminescent structure 10 may include a plurality of luminescent materials 18 therein that luminesce in response to receiving light of a specific wavelength. According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

According to various embodiments, first, second, and third luminescent structures 10a, 10b, 10c may be disposed on various portions of the lens 70. Accordingly, as the corresponding light sources 64 emit excitation light 24 towards the first, second, and third luminescent structures 10a, 10b, 10c, various wavelengths of converted light 26 are emitted from the light system 42.

In some embodiments, the light system 42 may include a decorative layer 94. The decorative layer 94 may include a material that is configured to control or modify an appearance of the lens 70, the activation layer 92, and/or any other portion of the light system 42. For example, the decorative layer 94 may be configured to confer a metallic appearance to portions of light system 42, such as the lens 70. Additionally, and/or alternatively, the decorative layer 94 may be utilized to assist in concealing the light system 42 disposed on the doorsill 44. The decorative layer 94 can be disposed on the lens 70, and/or any other portion of the light system 42, through any method known in the art, including, but not limited to, sputter deposition, vacuum deposition (vacuum evaporation coating), electroplating, or directly printing onto a component of the light system 42. The decorative layer 94 may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In various embodiments, the decorative layer 94 may be tinted any color to complement the vehicle 28 structure on which the light system 42 is to be received.

In various embodiments, the decorative layer 94 may have a textured or grained surface. The grained surface may be produced by laser etching the light system 42 and may provide for the light system 42 to have a varied or common appearance with proximately disposed components of the vehicle 28.

Figure 7:
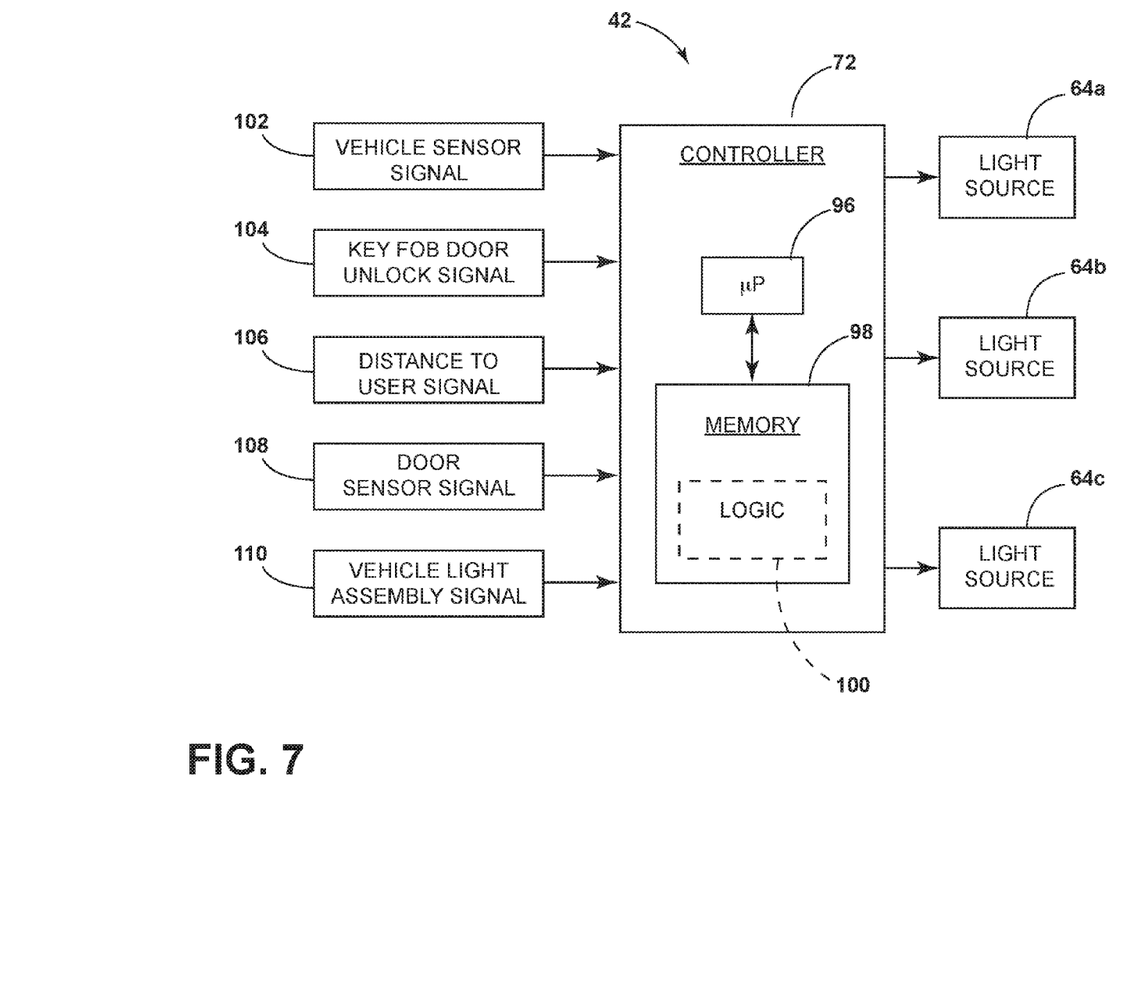
FIG. 7 is a block diagram of the light system, according to various embodiments.

Referring to FIG. 7, the light system 42 is further illustrated having the controller 72 receiving various inputs and controlling each of the light sources 64a, 64b, 64c, by applying signals to the light sources 64a, 64b, 64c. The controller 72 may include a microprocessor 96 and memory 98 as illustrated, according to various embodiments. It should be appreciated that the controller 72 may include control circuitry such as analog and/or digital control circuitry. Logic 100 is stored within memory 98 and executed by the microprocessor 96 for processing the various inputs and controlling each of the plurality of light sources 64a, 64b, 64c, as described herein. The inputs to the controller 72 may include a vehicle sensor signal 102, a key fob door unlock signal 104, a distance to user signal 106, a door sensor signal 108, and/or a vehicle light assembly signal 110.

The vehicle sensor signal 102 may include a signal provided from any sensor within the vehicle 28. In instances in which an occupant of the vehicle 28 should be notified of a vehicle condition, the controller 72 may activate one or more of the light sources 64a, 64b, 64c to provide the notification. For example, if the vehicle 28 has a condition such as low oil pressure, low tire pressure, low fuel, etc., the first light source 64a may increase and decrease in intensity in a first color (e.g., red) to notify an approaching occupant. Further, the second light source 64b may increase and decrease in intensity in an inverse pattern to that of the first light source 64a in the first color to provide additional notification to the approaching occupant. If an occupant is leaving the vehicle 28 and the vehicle 28 has the condition, or any other condition, the same illumination pattern 58 (FIGS. 2 and 3) may be emitted from the first and/or second light sources 64a, 64b. Moreover, the third light source 64c may additionally emit light in the first color and/or a second color, either in the cool or warm temperature range.

According to various embodiments, the vehicle 28 may include a vehicle stability system that includes a yaw rate sensor, an acceleration sensor, a steering sensor, and/or a torque request sensor. The controller 72 is configured to receive an output of the yaw rate sensor, the lateral acceleration sensor, the steering sensor, and/or the torque request sensor. Based on the output, the controller 72 may generate the vehicle sensor signal 102 for the light system 42. According to various embodiments, in instances in which the vehicle 28 is determined to be unstable by one or more of the sensors, the first and/or second light sources 64a, 64b may flash in a predefined color (e.g., amber). The flashing may be activated and deactivated in conjunction with any other vehicle hazard lights disposed on the vehicle 28.

The key fob door unlock signal 104 may be made available from another controller, e.g., a body control module, within the vehicle 28 that is in communication with the key fob 42 via wireless communication. Once the key fob and the vehicle 28 communicate, the welcome/farewell sequence may be initiated. In such instances, the first, second, and/or third light sources 64a, 64b, 64c may illuminate in one or more predefined colors. The illumination of the first, second, and/or third light sources 64a, 64b, 64c may be in conjunction with additional light sources 64 disposed on the exterior and/or within the vehicle 28.

Additionally, the controller 72 receives a distance to user signal 106, which is a distance that the occupant is detected from the vehicle 28. The distance to the user signal 106 may be generated by computing distance between the vehicle 28 and the key fob, according to various embodiments. Additionally, or alternatively, the controller 72 may include one or more wireless communication transceivers that may be configured to interact with an electronic device. The wireless communication transceivers may communicate with the electronic device over a wireless signal (e.g., radio frequency). In one non-limiting example, the wireless communication transceivers may be a Bluetooth™ RN4020 module, or an RN4020 Bluetooth™ low energy PICtail board configured to communicate with the electronic device using Bluetooth™ low energy signals. The wireless communication transceivers may include a transmitter and a receiver to transmit and receive wireless signals (e.g., Bluetooth™ signals) to and from the electronic device, to and from the light system 42 and/or to and from the vehicle 28. It will be appreciated that the wireless communication transceivers may utilize other forms of wireless communication between the electronic device and other wireless communication transceivers such as Wi-Fi™. Another controller such as a vehicle body control module may supply the distance to user signal 106. According to other embodiments, the distance to the user signal 106 could be generated using other sensors, such as an ultrasonic proximity sensor.

The controller 72 may further receive a door sensor signal 108. A door sensor may be configured to determine whether a door 30, 32, 34, 36 has been opened and/or closed. In some instances, the door sensor may include a switch or proximity sensor such as a Hall-effect sensor. The door sensor may be configured to output a door state signal. When the door 30, 32, 34, 36 is closed, the door state signal may indicate a closed state (i.e., the door 30, 32, 34, 36 is closed). When the door 30, 32, 34, 36 is open, the door state signal may indicate an open state (i.e., the door 30, 32, 34, 36 is open). The system may include any number of door sensors. At least one door sensor may be disposed on each door 30, 32, 34, 36. In addition, door sensors may be located on a hood, a trunk, a lift gate, and possibly other locations throughout the vehicle 28 such as lockable storage compartments.

According to various embodiments, a plurality of illumination patterns 56, 58, 60 is generated based on the signal provided from the door sensor. For example, when a vehicle engine is deactivated and a front door 30, 34 of the vehicle 28 is opened, the first and third light sources 64a, 64c may be illuminated. The second light source 64b may also be illuminated at a lower intensity to provide additional lighting along the side 38, 40 of the vehicle 28. If the vehicle engine is deactivated and a rear door 32, 36 of the vehicle 28 is opened, the second and third light sources 64b, 64c may be illuminated. The first light source 64a may also be illuminated at a lower intensity to provide additional lighting along the side 38, 40 of the vehicle 28.

According to various embodiments, if the vehicle engine is running and a vehicle transmission is not in park while a front door 30, 34 of the vehicle 28 is opened, the first, second, and/or third light sources 64a, 64b, 64c may be illuminated in a first predefined color (e.g., red). If the vehicle engine is running and a vehicle transmission is not in park while a rear door 32, 36 of the vehicle 28 is opened, the first, second, and/or third light sources 64a, 64b, 64c may be illuminated in a second predefined color (e.g., amber).

The vehicle 28 may further include an exterior light assembly that may include a headlamp, a brake lamp, a running lamp, a turn indicator lamp, a backup lamp, a hazard lamp, any other lamp that may be disposed on the exterior of the vehicle 28, and/or combinations thereof. The light system 42 provided herein may illuminate in conjunction with the exterior light assembly. For example, when the vehicle light assembly activates the hazard lamps of the vehicle 28 in a first color (e.g., amber), the first and/or second light sources 64a, 64b receive the vehicle light assembly signal 110 and may illuminate in conjunction with the hazard lights in the first color and/or a second color. The light system 42 may also initiate the first and/or second light sources 64a, 64b in conjunction with a turn indicator of the vehicle 28 on a side 38, 40 of the vehicle 28 that corresponds with the activated turn indicator upon receiving the vehicle light assembly signal 110. Further, the light system 42 may be utilized as a primary or supplemental running light and/or side marker of the vehicle 28. While being utilized as a running light or side marker, the first and/or second light sources 64a, 64b may emit excitation light 24 at a low intensity.

A variety of advantages may be derived from the use of the present disclosure. For example, use of the light system disclosed herein provides notifications to persons disposed proximately to the vehicle of the condition of the vehicle.

Moreover, the light system disclosed herein may repel and/or account for compounds or materials disposed on the lens of the light system. The light system may be manufactured at low costs when compared to standard vehicle light assemblies.

According to various embodiments, a light system is provided herein. The light system includes first and second light sources. A lens is configured to create a first illumination pattern when the first light source is activated and a second illumination pattern when the second light source is activated. A third light source is configured to create a third illumination pattern that extends vehicle outward of the first and second illumination patterns. A controller is configured to activate the first light source when a front door of the vehicle is opened and activate the second light source when a rear door of the vehicle is opened. The light system may be configured as a vehicle light system. Embodiments of the light system can include any one or a combination of the following features:

- the first illumination pattern extends vehicle rearward of the lens a first distance and the second light source extends vehicle rearward of the lens a second distance that is greater than the first distance;
- a light sensor configured to detect a presence of a compound on an outer surface of an outer surface of said light system;
- an activation layer disposed on the lens and configured to break down a compound disposed on the lens;
- the lens is configured from a hydrophobic material;
- the controller provides a notification when an amount of compound disposed on the lens is greater than a predefined value;
- a luminescent structure operably coupled with the first and second light sources and configured to luminesce in response to receiving excitation light from the first or second light source;
- the luminescent structure includes at least one luminescent material configured to convert an excitation light into a visible light;
- the first, second, and third light sources are disposed below a vehicle opening;
- the lens includes a first luminescent material and a second luminescent material, the first and second luminescent materials configured to luminesce in varied wavelengths of converted light; and/or
- the lens includes optics to direct a light generated by any of the first, second, and third light sources into the plurality of varied illumination patterns.

Moreover, the light system may be manufactured by disposing first and second light sources on a substrate; optically coupling a lens to with the first and second light sources, the lens configured to create a first illumination pattern when the first light source is activated and a second illumination pattern when the second light source is activated; disposing a third light source on the substrate, wherein the third light source is configured to create a third illumination pattern that extends vehicle outward of the first and second illumination patterns; and coupling a controller to the first, second, and third light sources to activate the first light source when a front door of the vehicle is opened and activate the second light source when a rear door of the vehicle is opened.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A light system for a vehicle, comprising:
   first and second light sources on a doorsill;
   a lens configured to create a first illumination pattern when the first light source is activated and a second illumination pattern when the second light source is activated;
   a third light source configured to create a third illumination pattern that extends vehicle outward of the first and second illumination patterns;
   a controller configured to activate the first light source when a front door of the vehicle is opened and activate the second light source when a rear door of the vehicle is opened; and
   a light sensor configured to detect a presence of a compound on an outer surface of the lens.

2. The light system for a vehicle of claim 1, wherein the first illumination pattern extends vehicle rearward of the lens a first distance and the second light source extends vehicle rearward of the lens a second distance that is greater than the first distance.

3. The light system for a vehicle of claim 1, further comprising:
   an activation layer disposed on the lens and configured to break down a compound disposed on the lens.

4. The light system for a vehicle of claim 1, wherein the lens is configured from a hydrophobic material.

5. The light system for a vehicle of claim 1, wherein the controller provides a notification when an amount of compound disposed on the lens is greater than a predefined value.

6. The light system for a vehicle of claim 1, further comprising:
   a luminescent structure operably coupled with the first and second light sources and configured to luminesce in response to receiving excitation light from the first or second light source.

7. A vehicle light system, comprising:
   a light source disposed on a doorsill of a vehicle;
   a lens operably coupled with the light source and configured to direct light towards a ground surface proximate an exterior portion of the vehicle; and
   a light sensor configured to detect a presence of a compound on an outer surface of said light system by detecting an amount of incident light reflected by the outer surface of the lens.

8. The vehicle light system of claim 7, wherein a controller provides a notification when an amount of compound disposed on said light system is greater than a predefined value.

9. The vehicle light system of claim 7, further comprising:
   an activation layer disposed on the lens and configured to break down a compound disposed on said light system upon receiving excitation light from the light source when the amount of compound disposed on said light system is greater than a predefined value.

10. The vehicle light system of claim 9, wherein the lens is formed from a hydrophobic material.

11. The vehicle light system of claim 7, wherein the light source is disposed below a vehicle opening.

12. The vehicle light system of claim 7, further comprising:
    a luminescent structure operably coupled with the light source and configured to luminesce in response to receiving excitation light from the light source.

13. The vehicle light system of claim 12, wherein the lens includes a first luminescent material and a second luminescent material, the first and second luminescent materials configured to luminesce in varied wavelengths of converted light.

14. A light system, comprising:
    a substrate and a lens, the substrate coupled to a doorsill of a vehicle;
    a first light source configured to illuminate a portion of ground proximate a front door;
    a second light source configured to illuminate a portion of ground proximate a rear door;
    a third light source configured to illuminate a ground surface outwardly of the first and second light sources; and
    a light sensor configured to detect a presence of a compound on an outer surface of the lens.

15. The light system of claim 14, wherein the lens includes optics to direct a light generated by any of the first, second, and third light sources into the plurality of varied illumination patterns.

16. The light system of claim 14, wherein the lens is formed from a material containing silicone.

17. The light system of claim 14, further comprising:
    a luminescent structure operably coupled with any of the first, second, and third light sources and configured to luminesce in response to receiving excitation light.

18. The light system of claim 16, wherein the luminescent structure includes at least one luminescent material configured to convert an excitation light into a visible light.

* * * * *